(12) United States Patent
Chen et al.

(10) Patent No.: US 10,268,076 B2
(45) Date of Patent: Apr. 23, 2019

(54) DISPLAY DEVICES AND RELATED METHODS INVOLVING PATTERNED PHASE RETARDING

(71) Applicant: a.u. Vista Inc., Milpitas, CA (US)

(72) Inventors: Hai-Wei Chen, Orlando, FL (US); Shin-Tson Wu, Orlando, FL (US); Wei Duan, Hubei (CN); Ming-Chun Li, Hsinchu (TW); Seok-Lyul Lee, Hsinchu (TW)

(73) Assignees: A.U. VISTA INC., Milpitas, CA (US); THE UNIVERSITY OF CENTRAL FLORIDA RESEARCH FOUNDATION, INC., Orlando, FL (US)

( * ) Notice: Subject to any disclaimer, the term of this patent is extended or adjusted under 35 U.S.C. 154(b) by 73 days.

(21) Appl. No.: 15/464,481

(22) Filed: Mar. 21, 2017

(65) Prior Publication Data
US 2018/0275443 A1 Sep. 27, 2018

(51) Int. Cl.
*G02F 1/1335* (2006.01)
*G02F 1/13363* (2006.01)
(Continued)

(52) U.S. Cl.
CPC ....... *G02F 1/13362* (2013.01); *G02B 5/3016* (2013.01); *G02B 6/005* (2013.01);
(Continued)

(58) Field of Classification Search
CPC .................................................. G02F 1/13362
See application file for complete search history.

(56) References Cited

U.S. PATENT DOCUMENTS

2005/0168815 A1* 8/2005 Maruyama ........... H04N 13/337
359/465
2006/0082702 A1* 4/2006 Jacobs ................. G02B 5/3083
349/96
(Continued)

FOREIGN PATENT DOCUMENTS

WO 2016002434 A1 1/2016

OTHER PUBLICATIONS

Yaroshchuk, et al.: "Photoalignment of liquid crystals: basics and current trends"; Journals of Materials Chemistry J. Mater. Chem., 2012, 22, 286; This journal is copyright the Royal Society of Chemistry 2012; pp. 286-300.

(Continued)

*Primary Examiner* — Sang V Nguyen
(74) *Attorney, Agent, or Firm* — McClure, Qualey & Rodack, LLP (57) ABSTRACT

Display devices and related methods involving patterned phase retarding are provided. A representative display device includes: a backlight unit, having a light source and a color conversion layer having an alignment direction, the light comprising a first light exhibiting a first upstream polarization ratio, a second light exhibiting a second upstream polarization ratio, and a third light exhibiting a third upstream polarization ratio; and a patterned phase retarder positioned to receive the light, having a plurality of half-wave regions to alter polarization of light passing therethrough, and a plurality of free regions to pass light without altering the polarization; wherein polarization ratio (PR) is defined by $PR=(I_{\parallel}-I_{\perp})/(I_{\parallel}+I_{\perp})$; and wherein the first upstream polarization ratio exhibits a first sign, and both the second upstream polarization ratio and the third upstream polarization ratio exhibit a second sign opposite the first sign.

18 Claims, 8 Drawing Sheets

(51) Int. Cl.
 *G02B 5/30* (2006.01)
 *F21V 8/00* (2006.01)
(52) U.S. Cl.
 CPC ....... *G02B 6/0056* (2013.01); *G02F 1/13363* (2013.01); *G02F 2001/133567* (2013.01); *G02F 2001/133614* (2013.01); *G02F 2001/133631* (2013.01); *G02F 2001/133638* (2013.01); *G02F 2202/36* (2013.01); *G02F 2413/01* (2013.01)

(56) References Cited

U.S. PATENT DOCUMENTS

| | | | | |
|---|---|---|---|---|
| 2009/0290079 | A1* | 11/2009 | Evans | G02B 27/2278 349/18 |
| 2012/0262500 | A1* | 10/2012 | Kitazawa | G02B 5/008 345/690 |
| 2016/0011353 | A1* | 1/2016 | Escuti | G02B 27/283 359/15 |
| 2016/0147101 | A1* | 5/2016 | Saneto | G02F 1/13362 349/71 |
| 2017/0108726 | A1* | 4/2017 | Yanai | G02B 5/30 |

OTHER PUBLICATIONS

Schadt, et al.: "Surface-Induced Parallel Alignment of Liquid Crystals by Linearly Polymerized Photopolymers"; Jpn. J. Appl. Phys. vol. 31 (1992) pp. 2155-2164; Part 1, No. 7, Jul. 1992.

\* cited by examiner

DISPLAY DEVICES AND RELATED METHODS INVOLVING PATTERNED PHASE RETARDING

BACKGROUND

Technical Field

The disclosure generally relates to displays that use polarized light.

Description of the Related Art

Displays, such as liquid crystal displays (LCDs), are widely used in electronic devices, such as laptops, smart phones, digital cameras, billboard-type displays, and high-definition televisions. In addition, electroluminescent displays such as OLEDs are also gaining in public attention.

LCD panels may be configured as disclosed, for example, in Wu et al., U.S. Pat. No. 6,956,631, which is assigned to AU Optronics Corp., the parent company of the assignee of the current application, and hereby incorporated by reference in its entirety. As disclosed in Wu et al. FIG. 1, the LCD panel may comprise a top polarizer, a lower polarizer, a liquid crystal cell, and a back light. Light from the back light passes through the lower polarizer, through the liquid crystal cell, and then through the top polarizer. As further disclosed in Wu et al. FIG. 1, the liquid crystal cell may comprise a lower glass substrate and an upper substrate containing color filters. A plurality of pixels comprising thin film transistor (TFT) devices may be formed in an array on the glass substrate, and a liquid crystal compound may be filled into the space between the glass substrate and the color filter forming a layer of liquid crystal material.

As explained in Sawasaki et al., U.S. Pat. No. 7,557,895, which is assigned to AU Optronics Corp., the parent company of the assignee of the current application, and hereby incorporated by reference in its entirety, the thickness of the liquid crystal layer typically must be uniformly controlled, in order to avoid unevenness in brightness across the LCD panel. As disclosed in Sawasaki et al., the required uniformity may be achieved by disposing a plurality of pillar spacers between the TFT substrate and the color filter substrate. As further disclosed in Sawasaki et al., the pillar spacers may be formed with different heights, such that some spacers have a height that is greater than the gap between the substrates and other spacers have a height that is less than the gap between the substrates. This configuration may permit the spacing between the substrates to vary with temperature changes but also prevent excessive deformation when forces are applied to the panel.

Sawasaki et al. further discloses a method for assembling the substrates with the liquid crystal material between them. This method comprises steps of preparing the two substrates, coating a sealing material on the circumference of the outer periphery of one of the pair of substrates, dropping an appropriate volume of liquid crystal on one of the pair of substrates, and filling in the liquid crystal between the pair of substrates by attaching the pair of substrates in a vacuum followed by returning the attached pair of substrates to atmospheric pressure.

In LCD panels, the semiconductor material making up the TFT channel may be amorphous silicon. However, as disclosed in Chen, U.S. Pat. No. 6,818,967, which is assigned to AU Optronics Corp., the parent company of the assignee of the current application, and hereby incorporated by reference in its entirety, poly-silicon channel TFTs offer advantages over amorphous silicon TFTs, including lower power and greater electron migration rates. Poly-silicon may be formed by converting amorphous silicon to poly-silicon via a laser crystallization or laser annealing technique. Use of the laser permits fabrication to occur at temperatures below 600° C., and the fabricating technique is thus called low temperature poly-silicon (LTPS). As disclosed in Chen, the re-crystallization process of LTPS results in the formation of mounds on the surface of the poly-silicon layer, and these mounds impact the current characteristics of the LTPS TFT. Chen discloses a method to reduce the size of the LTPS surface mounds, by performing a first anneal treatment, then performing a surface etching treatment, for example using a solution of hydrofluoric acid, and then performing a second anneal treatment. The resulting LTPS surface has mounds with a height/width ratio of less than 0.2. A gate isolation layer, gate, dielectric layer, and source and drain metal layers can then be deposited above the LTPS layer to form a complete LTPS TFT.

As disclosed in Sun et al., U.S. Pat. No. 8,115,209, which is assigned to AU Optronics Corp., the parent company of the assignee of the current application, and hereby incorporated by reference in its entirety, a disadvantage of LTPS TFTs compared to amorphous silicon TFTs is a relatively large leakage current during TFT turn off. Use of multiple gates reduces leakage current, and Sun et al. discloses a number of different multi-gate structures for a polycrystalline silicon TFT, including those shown in Sun et al. FIGS. 2A-2B and 3-6.

As the demand for improved color performance continues for display devices, research in various color conversion technologies such as quantum dot and quantum rod have shown promise. By way of example, quantum dot (QD) is an excellent energy down-conversion material with high quantum efficiency (>90%) and narrow emission bandwidth (FWHM<30 nm). Due to these unique features, QD is becoming widely used in LCD backlight to enhance the color performance. However, the emitted light of QD material is isotropic and unpolarized, so that over 50% of the emitted light would be absorbed by a linear polarizer before entering the liquid crystal (LC) layer.

SUMMARY

Display devices and related methods involving patterned phase retarding are provided. In one embodiment, a display device comprises: a backlight unit having a light source and a color conversion layer, the backlight unit being configured to emit light along a propagation direction, the light comprising a first light exhibiting a first upstream polarization ratio, a second light exhibiting a second upstream polarization ratio, and a third light exhibiting a third upstream polarization ratio, the color conversion layer having an alignment direction perpendicular to the propagation direction; and a patterned phase retarder positioned to receive the light emitted from the backlight unit, the patterned phase retarder having a plurality of half-wave regions, configured to alter polarization of light passing therethrough, and a plurality of free regions, configured to pass light therethrough without altering polarization of the light; wherein polarization ratio (PR) is defined by $PR=(I_\parallel - I_\perp)/(I_\parallel + I_\perp)$, with $I_\parallel$ being peak intensity of light polarized parallel to the alignment direction, and $I_\perp$ being peak intensity of light polarized perpendicular to the alignment direction; and wherein the first upstream polarization ratio exhibits a first sign, and both the second upstream polarization ratio and the third upstream polarization ratio exhibit a second sign opposite the first sign.

Another embodiment of a display device comprises: a backlight unit having a light source and a color conversion layer; a patterned phase retarder positioned on the backlight unit, the patterned phase retarder having a plurality of half-wave regions and a plurality of free regions, the half-wave regions being configured to alter polarization of light passing therethrough, the free regions being configured to pass light therethrough without altering polarization of the light; a display medium disposed on the patterned phase retarder, the display medium comprising a plurality of first sub-pixels, second sub-pixels and third sub-pixels, wherein the first sub-pixels are aligned with only the half-wave regions or only the free regions, and the second sub-pixels and the third sub-pixels are aligned with the regions not aligned with the first sub-pixels.

In another embodiment, a display method comprises: propagating light through a color conversion layer such that a first light exhibits a first upstream polarization ratio, a second light exhibits a second upstream polarization ratio, and a third light exhibits a third upstream polarization ratio, the color conversion layer having an alignment direction perpendicular to a propagation direction of the light; and propagating the first light, the second light and the third light through a patterned phase retarder having a plurality of half-wave regions, configured to alter polarization of light passing therethrough, and a plurality of free regions, configured to pass light therethrough without altering polarization of the light; wherein polarization ratio (PR) is defined by $PR=(I_\parallel-I_\perp)/(I_\parallel+I_\perp)$, with $I_\parallel$ being peak intensity of light polarized parallel to the alignment direction, and $I_\perp$ being peak intensity of light polarized perpendicular to the alignment direction; and wherein the first upstream polarization ratio exhibits a first sign, and both the second upstream polarization ratio and the third upstream polarization ratio exhibit a second sign opposite the first sign.

Other objects, features, and/or advantages will become apparent from the following detailed description of the preferred but non-limiting embodiments. The following description is made with reference to the accompanying drawings.

DETAILED DESCRIPTION

For ease in explanation, the following discussion describes embodiments of the present disclosure in the context of an LCD display. It is to be understood that the invention is not limited in its application to the details of the particular arrangements shown since the invention is capable of other embodiments. Also, the terminology used herein is for the purpose of description and not of limitation.

In this regard, display devices and related methods involving patterned phase retarding are provided. Several exemplary embodiments will next be described with reference to the drawings.

Figure 1:
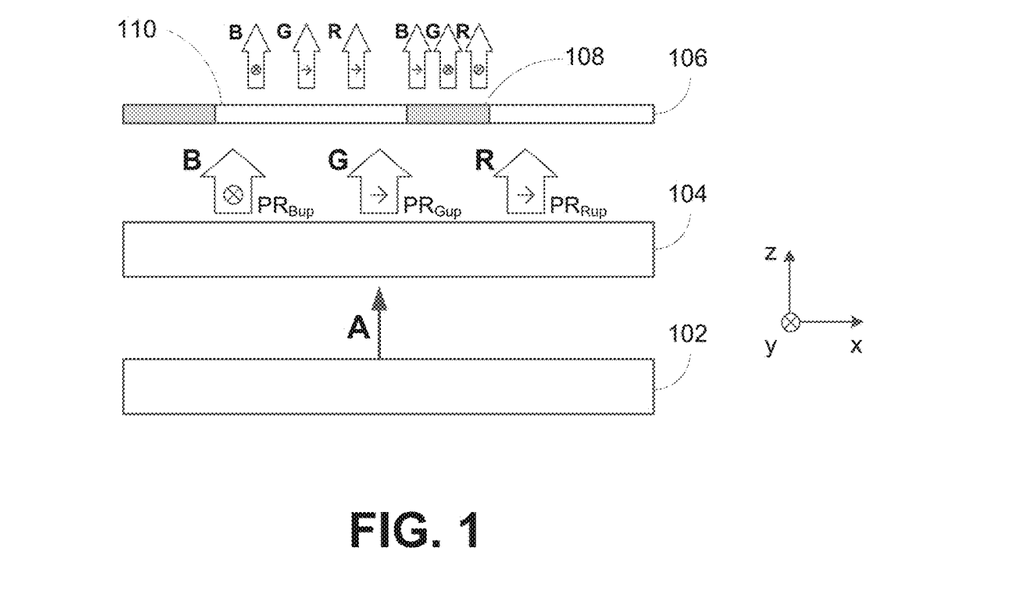
FIG. 1 is a schematic diagram of an embodiment of a display device.

As shown in FIG. 1, an embodiment of a display device 100 is depicted that incorporates a light source 102 and a color conversion layer 104. Light source 102 emits light (e.g., blue light) along a propagation direction (depicted by arrow A). Color conversion layer 104 is positioned downstream of light source 102 with respect to the propagation direction. Notably, the color conversion layer exhibits an alignment direction that is perpendicular to the propagation direction.

Display device 100 also includes a patterned phase retarder 106 that is positioned downstream of color conversion layer 104. Patterned phase retarder 106 receives the light emitted from light source 102 after the light passes through color conversion layer 104. Patterned phase retarder 106 incorporates half-wave regions (e.g., half-wave region 108) and free regions (e.g., free region 110). The half-wave regions are configured to alter polarization of light passing through the half-wave regions, whereas the free regions are configured to pass light without substantially altering the polarization of the light.

In operation, light source 102 emits light along the propagation direction (A) to color conversion layer 104, which converts the light into partially linearly polarized white light. As such, the light propagating downstream from color conversion layer 104 includes a first light B (e.g., blue light) exhibiting a first upstream polarization ratio $PR_{Bup}$, a second light G (e.g., green light) exhibiting a second upstream polarization ratio $PR_{Gup}$, and a third light R (e.g., red light) exhibiting a third upstream polarization ratio $PR_{Rup}$.

In this context, the designation of "upstream" in first upstream polarization ratio, for example, is used relative to patterned phase retarder 106. Additionally, polarization ratio (PR) is defined by $PR=(I_\parallel-I_\perp)/(I_\parallel+I_\perp)$, with $I_\parallel$ being peak intensity of light polarized parallel to the alignment direction of the color conversion layer, and $I_\perp$ being peak intensity of light polarized perpendicular to the alignment direction. Owing to the characteristics of color conversion layer 104, the first upstream polarization ratio associated with the first light exhibits a first sign (e.g., +), and both the second upstream polarization ratio and the third upstream polarization ratio associated with the second light and the third light, respectively, exhibit a second sign (e.g., −) opposite the first sign.

In some embodiments, partially linearly polarized white light with one preferred polarization direction is provided using a color conversion layer with well-alignment quantum rod (QR) nano-particles (e.g., a QR film). For instance, green and red quantum rods of a QR film may be provided in a well-aligned configuration to induce anisotropic emission and the well-aligned direction is the alignment direction. Such a QR film may be similar to quantum dot enhancement film (QDEF) working as a color conversion layer, in that both QD and QR show high quantum yield and narrow emission bandwidth. In some embodiments, quantum rod film may be synthesized using different materials, such CdSe, InP or Perovskite composites, for example. However, apart from anisotropic emission, QR film also exhibits anisotropic absorption. As such, remaining blue light is partially linearly polarized but in a direction (e.g., y-axis) that is orthogonal to that of the polarization direction of green light and red light (e.g., x-axis). Patterned phase retarder 106 is provided to address this issue.

Figure 2:
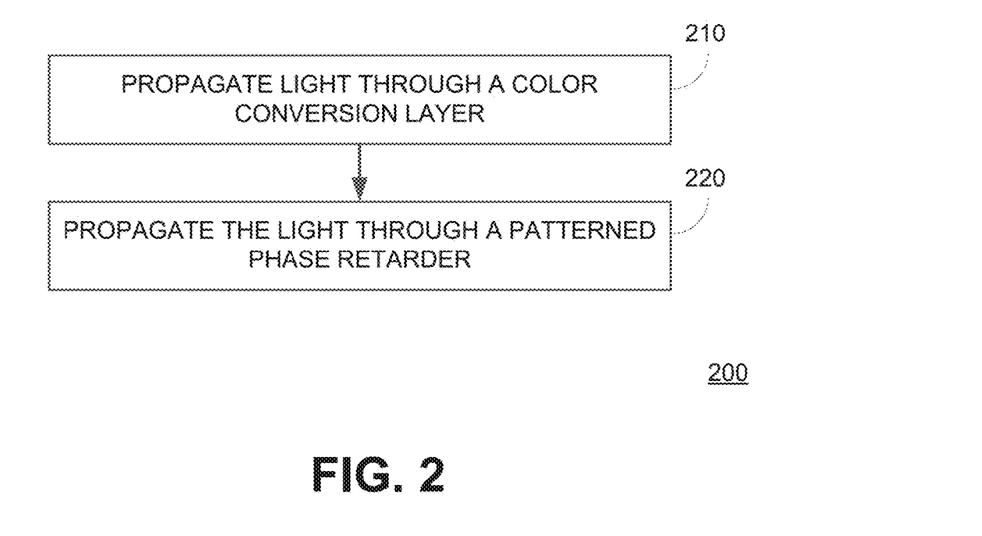
FIG. 2 is a flowchart depicting an embodiment of a display method.

FIG. 2 is a flowchart depicting an embodiment of a display method, such as may be implemented by the display device of FIG. 1. As shown in FIG. 2, the method 200 may be construed as beginning at block 210, in which light is propagated through a color conversion layer such that a first light exhibits a first upstream polarization ratio, a second light exhibits a second upstream polarization ratio, and a third light exhibits a third upstream polarization ratio. Once again, polarization ratio (PR) is defined by $PR=(I_\parallel-I_\perp)/(I_\parallel+I_\perp)$, with $I_\parallel$ being peak intensity of light polarized parallel to the alignment direction, and $I_\perp$ being peak intensity of light polarized perpendicular to the alignment direction. Notably, the first upstream polarization ratio exhibits a first sign (e.g., + or −), and both the second upstream polarization ratio and the third upstream polarization ratio exhibit a second sign (e.g., − or +) opposite the first sign.

In block 220, after passing through the color conversion layer, the light (i.e., first light, the second light, and the third light) is propagated through a patterned phase retarder. In particular, the patterned phase retarder incorporates a half-wave regions and free regions patterned to selectively alter polarization of light passing through the patterned phase retarded.

Figure 3A:
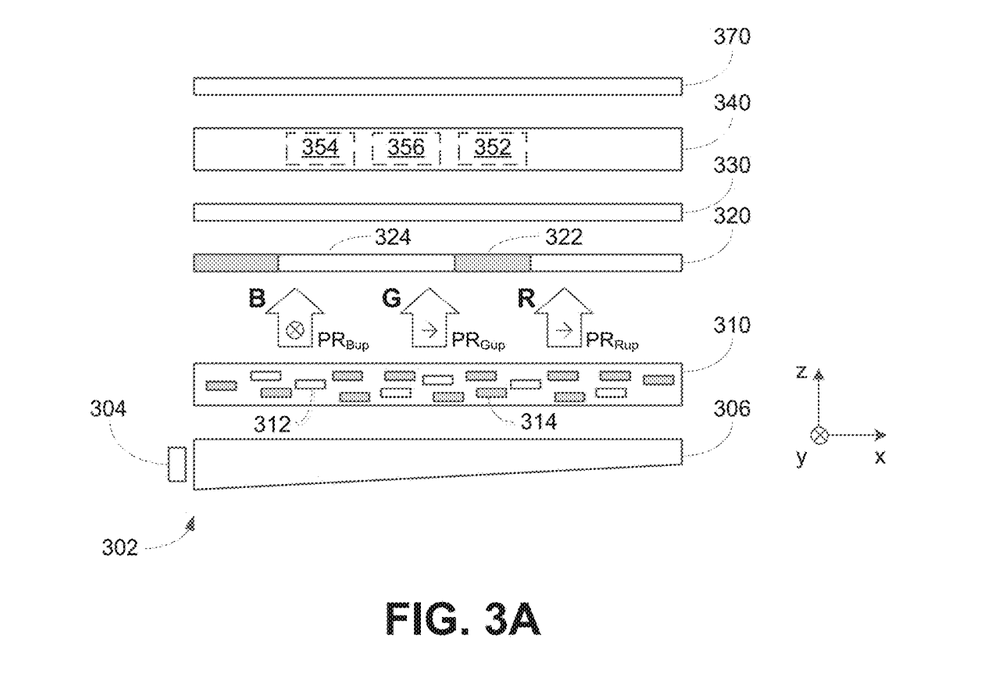
FIG. 3A is a schematic diagram of another embodiment of a display device.

FIG. 3A is a schematic diagram of another embodiment of a display device. As shown in FIG. 3A, display device 300 includes a backlight unit 302 in an edge-lit configuration that incorporates a light source 304 and a light guide plate 306. In some embodiments, light source 304 is an array of LEDs for providing unpolarized blue light B that is directed by light guide plate 306 along a propagation direction towards a color conversion layer 310.

Color conversion layer 310 is positioned downstream of backlight unit 302 with respect to the propagation direction to receive the unpolarized blue light. In this embodiment, color conversion layer 310 is provided as a QR film that includes green rods (e.g., rod 312) and red rods (e.g., rod 314) that are aligned to induce anisotropic emission.

A patterned phase retarder 320 is positioned downstream of color conversion layer 310. Patterned phase retarder 320 incorporates half-wave regions (e.g., half-wave region 322) and free regions (e.g., free region 324) that are aligned for selectively altering the polarization of received light and propagating that light downstream to a polarizer 330. In some embodiments, the regions of patterned phase retarder 320 are provided by LC polymers (LCP) of different alignment configurations. By way of example, LCPs with 90° twisted nematic alignment may be used for half-wave regions, and LCPs with anti-parallel alignment (i.e., homogenous) may be used for free regions. So configured, the half-wave regions switch the polarization of received light, while the free regions do not.

Figure 3B:
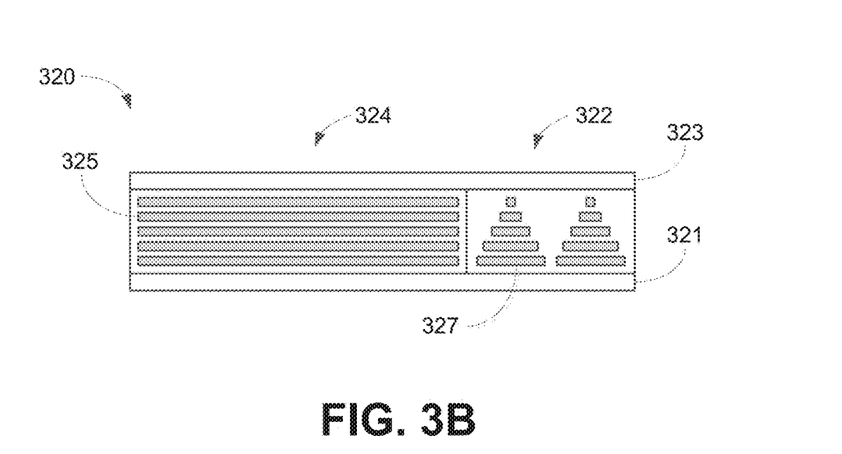
FIG. 3B is a schematic diagram of the embodiment of FIG. 3A showing detail of a portion of a patterned phase retarder.

FIG. 3B is a schematic diagram of the embodiment of FIG. 3A showing detail of a portion of patterned phase retarder 320. As is shown, patterned phase retarder 320 includes two substrates (321, 323), which are formed of glass, for example. LCPs are sandwiched between the substrates. By way of example, an LC molecule 325 of a first configuration is positioned within free region 324, and an LC molecule 327 of a second configuration is positioned within half-wave region 322. It should be noted that different LC modes, such as nematic LCs, blue phase LCs, uniformly standing helix LCs, uniformly lying helix LCs, etc., may be used. Additionally, various electrode structures may be used in different embodiments, such as vertical-alignment (VA), twisted nematic (TN), in-plane switching (IPS), and fringe field switching (FFS), among others.

Downstream of polarizer 330 is a display medium 340, which incorporates a color filter array and an LC layer (both of which are not shown), and an analyzer 370. The color filter array of display medium 340 includes an array of sub-pixels, including a plurality of blue sub-pixels (e.g., sub-pixel 352), a plurality of green sub-pixels (e.g., sub-pixel 354), and a plurality of red sub-pixels (e.g., sub-pixel 356). It should be noted that, in some embodiments, the color filter array may be associated with a top substrate and positioned above the LC layer, whereas in other embodiments, the color filter array may be associated with a bottom substrate and positioned below the LC layer.

In this embodiment, the blue sub-pixels are aligned (i.e., at least substantially aligned) with respect to the propagation direction with the half-wave regions, and the green sub-pixels and red sub-pixels are aligned (i.e., at least substantially aligned) with the free regions of patterned phase retarder 320. Substantially aligned includes potential manufacturing misalignment, which may be highly dependent on pixel size. By way of example, for a large-sized television, each pixel may be 240 um*80 um. Thus, it may be desirable for any misalignment to be less than ~20 um. For a smart-phone, each pixel may be ~60 um*20 um. Thus, it may be desirable for any misalignment to be less than ~5 um or, stated differently, less than 25% of the pixel size (length or width).

Figure 3C:
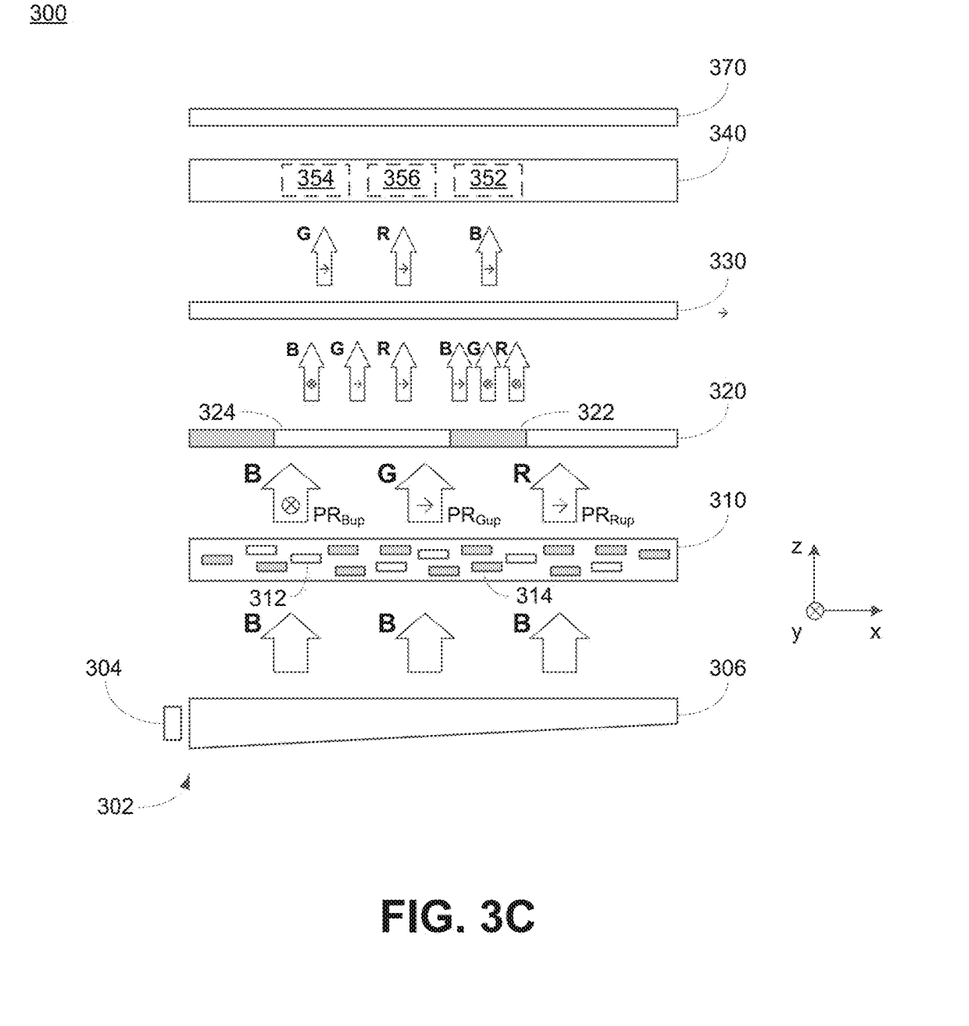
FIG. 3C is a schematic diagram of the embodiment of FIG. 3A showing detail regarding the directing of light towards selected sub-pixels.

FIG. 3C is a schematic diagram of the embodiment of FIG. 3A showing detail regarding the directing of light towards selected ones of the sub-pixels. As shown in FIG. 3C, light source 304 provides unpolarized blue light B that is directed by light guide plate 306 to color conversion layer 310.

Within color conversion layer 310, the unpolarized blue light excites well-aligned green and red quantum rods (e.g., QRs 312 and 314). In this example, the larger dipole moment of the QRs is aligned with the x-axis, which determines the preferred emission direction. In other words, the x-axis direction is the alignment direction. Simultaneously, absorption along the x-axis is stronger than absorption along the y-axis. As a result, most of the blue light oriented along the x-axis is absorbed, leaving partially linearly polarized blue light oriented along the y-axis. Thus, the polarization directions downstream of color conversion layer 310 of the remaining blue light (y-axis), and emitted green light and red light (x-axis) are orthogonal.

The remaining blue light and emitted green light and red light then pass through patterned phase retarder 320. Specifically, the light passing through the free regions retains its upstream polarization ratio; however, the light passing through the half-wave regions is altered. In this embodiment, polarization of the light passing through the half-wave regions is switched by 90°, thus changing the sign (+/−) of the polarization ratio so that the upstream polarization ratio of the light passing through the half-wave regions exhibits a change in sign with respect to the downstream polarization ratio (i.e., after passage of the patterned phase retarder). As an example, blue light passing through half-wave region 322 changes from predominantly y-axis polarization to predominantly x-axis polarization.

Based on the upstream polarization ratios exhibited by the light after passing through patterned phase retarder 320, the light received by polarizer 330 is selectively filtered. In this example, polarizer 330 is configured with a transmission axis that is the same as the alignment direction of the quantum rod alignment (i.e., along the x-axis), thus only light with x-axis polarization is passed downstream to display medium 340. Since the half-wave regions are aligned with the blue sub-pixels, this ensures that x-axis polarized blue light is directed towards the blue pub-pixels to the exclusion of green and red light. Free region alignment with the green sub-pixels and red sub-pixels ensures that green light and red light are directed toward these sub-pixels to the exclusion of blue light.

A potential advantage of an embodiment such as that depicted in FIGS. 3A and 3C is being able to provide purer colors and a resultant larger color gamut. Notably, for a conventional LCD, red, green and blue light traverses each pixel at the same time, which may cause severe light crosstalk between adjacent color filters. As such, color purity is deteriorated, leading to a reduced color gamut. In an embodiment such as that depicted in FIGS. 3A and 3B, predominantly blue light enters the blue sub-pixels, while most of the green light and red light is blocked by the polarizer based on the orthogonal polarization. A similar case exists with respect to the green sub-pixels and the red sub-pixels, as most of the blue light is blocked. As a result, color crosstalk is reduced.

Figure 4A:
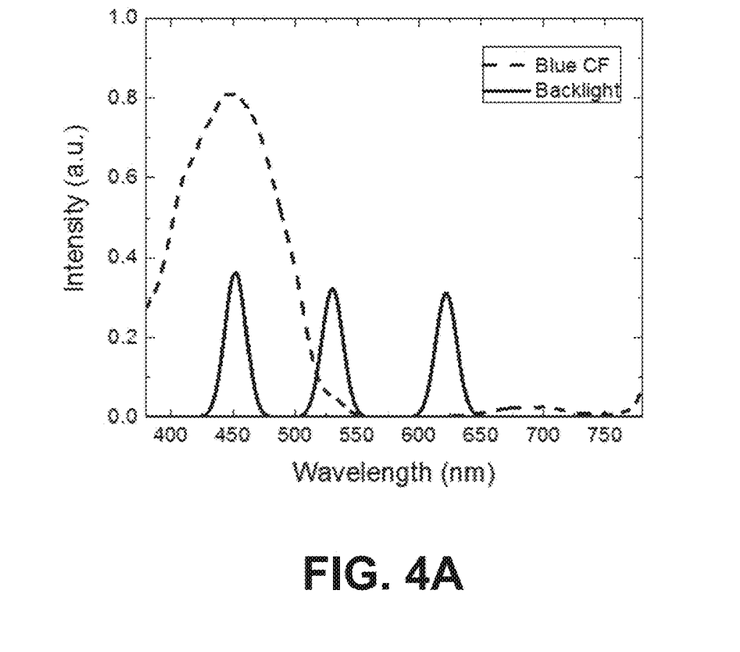
FIGS. 4A, 4B, 5A and 5B are graphs depicting intensity versus wavelength for conventional quantum dot LCD (4A and 4B), and quantum rod LCD (5A and 5B) using patterned phase retarding.
Figure 4B:
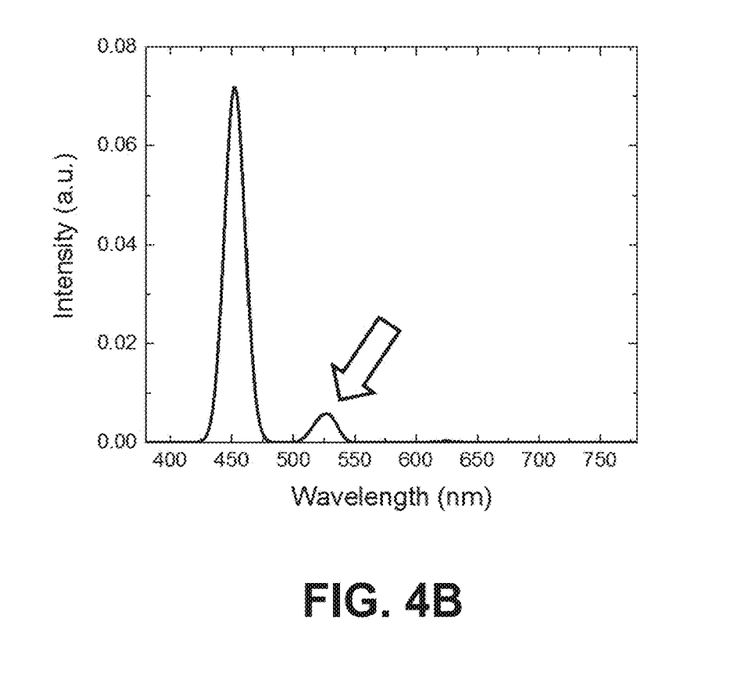
Figure 5A:
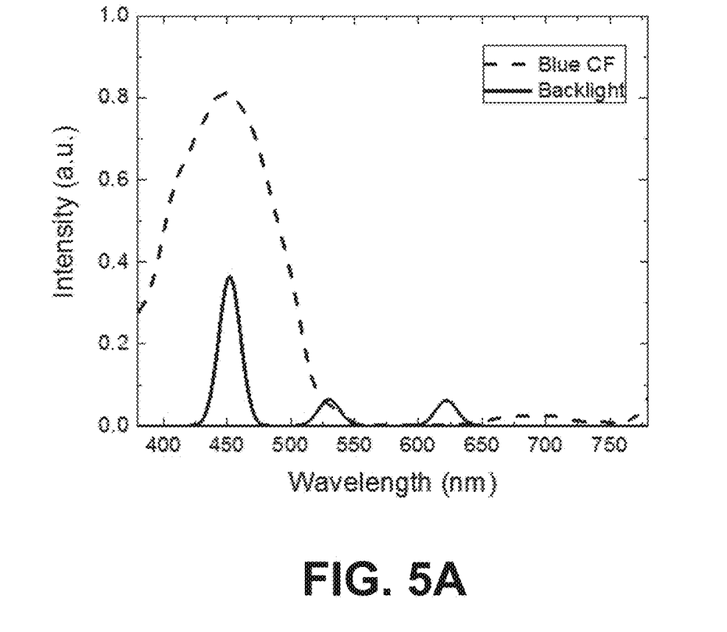
Figure 5B:
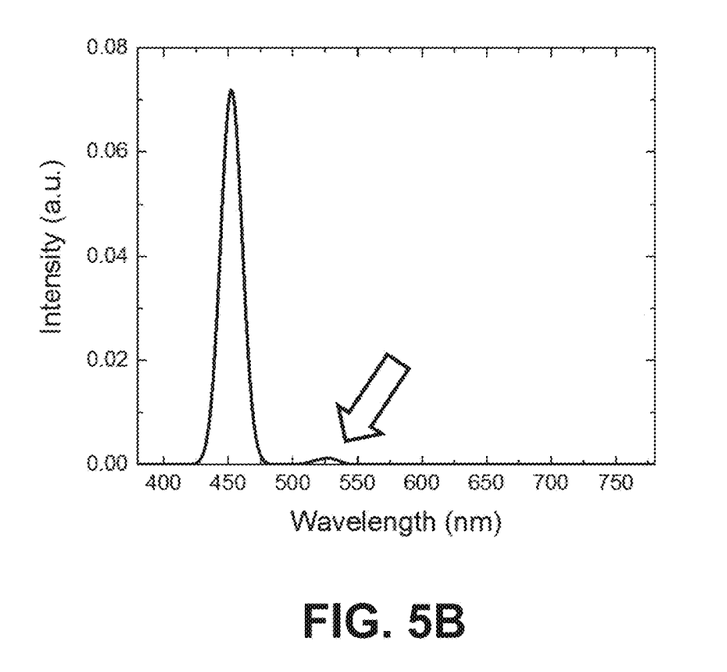

In this regard, FIGS. 4A-4B and FIGS. 5A-5B, show simulated blue output spectrum for a conventional QD LCD compared to a proposed QR LCD. In particular, FIG. 4A depicts the transmission spectrum of a blue color filter (shown with the dashed line) for a conventional QD LCD, and the spectrum from backlight with QD film (shown with the solid line) for the conventional QD LCD. FIG. 5A depicts the transmission spectrum of a blue color filter (shown with the dashed line) for a proposed QR LCD, and spectrum from backlight with QR film (shown with the solid line) for the proposed QR LCD. Additionally, FIG. 4B depicts a simulated blue output spectrum for the conventional QD LCD, and FIG. 5B depicts a simulated blue output spectrum for the proposed QR LCD. Note that, in the figures, a polarization ratio of the associated color conversion layer for the proposed QR LCD is 5:1.

As shown, the improvement of color crosstalk is quite significant. Moreover, the resultant color gamut could reach 96% Rec. 2020 without any modifications to the color filter array. For reference, the best QD LCD based on current technology may reach 91% Rec. 2020 with specially designed color filters; however, there is a potentially significant sacrifice in terms of efficiency.

FIG. 4A shows the transmission spectrum of a blue color filter and backlight spectrum entering the blue color filter for a conventional QD LCD. With the QD LCD of FIG. 4A, backlight passes through blue color filter to provide a blue primary color. Please note that here, backlight is white light. As a result, there is noticeable light leakage from the green region (500 nm~550 nm), thus deteriorating the blue color purity and leading to a reduced color gamut. FIG. 4B shows that the output blue color is not pure for the case of the QD LCD.

In the proposed QR LCD (which incorporates a patterned phase retarder), however, blue light and green/red light are decoupled in terms of polarization direction. Thus, the backlight spectrum entering the blue color filter is different. Specifically, only blue light and a small portion of green/red light (as determined by the polarization ratio of the color conversion layer) are permitted to pass through the blue color filter (polarizer) as shown in FIG. 5A. After the blue color filter, the crosstalk is greatly suppressed (500 nm~550 nm) as shown in FIG. 5B, resulting in an improvement in color purity and a correspondingly larger color gamut.

Figure 6:
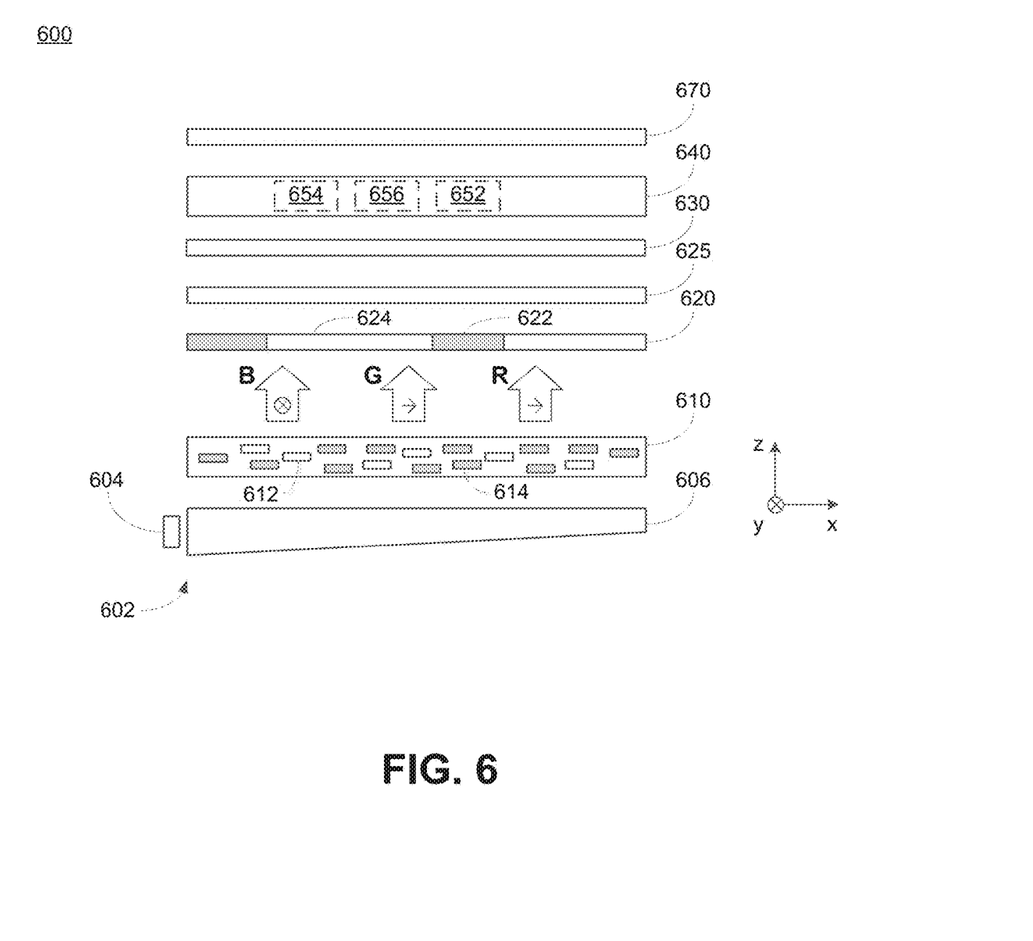
FIG. 6 is a schematic diagram of another embodiment of a display device.

FIG. 6 is a schematic diagram of another embodiment of a display device. As shown in FIG. 6, display device 600 includes a backlight unit 602 in an edge-lit configuration that incorporates a light source 604 and a light guide plate 606. In some embodiments, light source 604 is configured to provide unpolarized blue light that is directed by light guide plate 606 along a propagation direction towards a color conversion layer 610.

Color conversion layer 610 is positioned downstream of backlight unit 602 to receive the unpolarized blue light. In this embodiment, color conversion layer 610 is provided as a QR film that includes green rods (e.g., rod 612) and red rods (e.g., rod 614) that are aligned to induce anisotropic emission such that partially linearly polarized white light is provided.

A patterned phase retarder 620 is positioned downstream of color conversion layer 610. Patterned phase retarder 620 incorporates half-wave regions (e.g., half-wave region 622) and free regions (e.g., free region 624) that are aligned for selectively altering the polarization of received light. A polarizer 630 is positioned downstream of patterned phase retarder 620.

In contrast to the previous embodiment, a reflective polarizer 625 (e.g., a dual brightness enhancement film) is positioned between patterned phase retarder 620 and polarizer 630. In this embodiment, the transmission axis of reflective polarizer 625 is the same as that of polarizer 630. Therefore, before entering polarizer 630, unwanted polarized light (i.e., light oriented along the y-axis in this example) would be reflected and recycled in order to enhance optical efficiency.

Downstream of polarizer 630 is a display medium 640 incorporating a color filter array and an LC layer (both of which are not shown), and an analyzer 670. The color filter array of display medium 640 includes an array of sub-pixels, including a plurality of blue sub-pixels (e.g., sub-pixel 652), a plurality of green sub-pixels (e.g., sub-pixel 654), and a plurality of red sub-pixels (e.g., sub-pixel 656).

Figure 7:
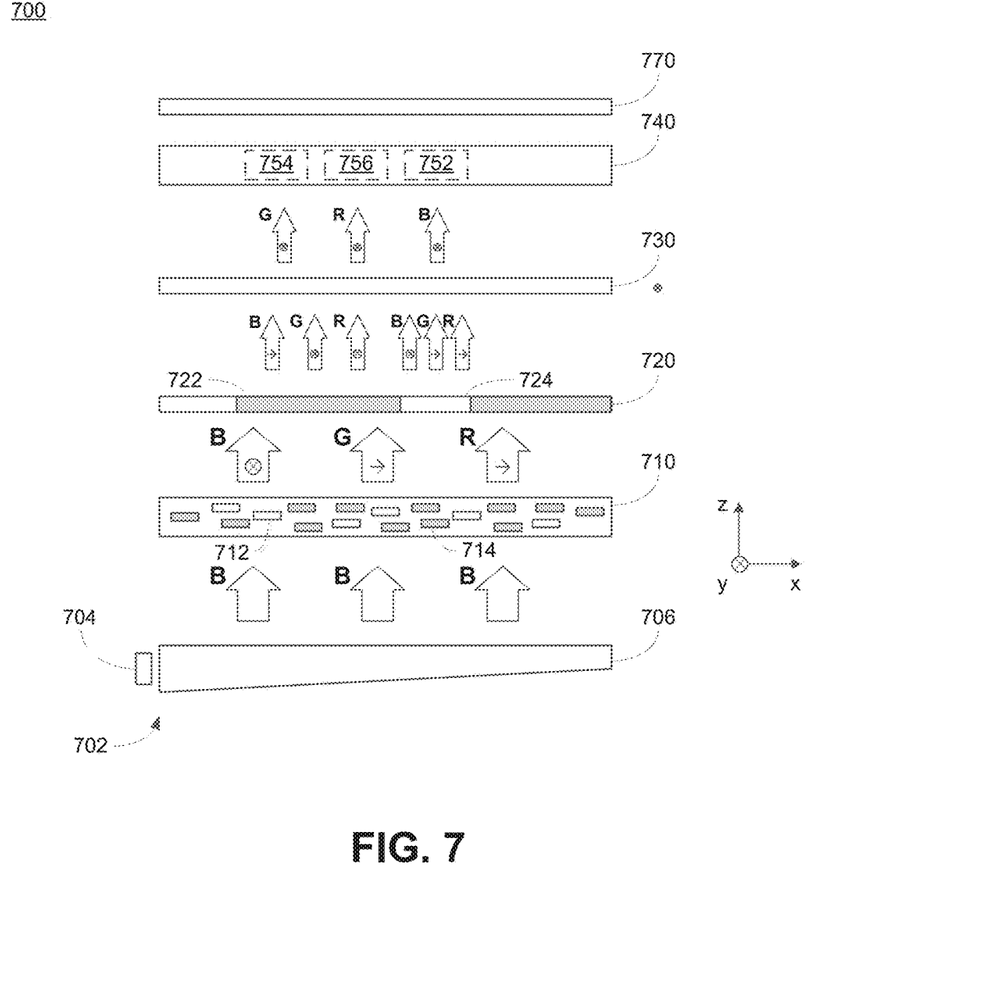
FIG. 7 is a schematic diagram of still another embodiment of a display device.

FIG. 7 is a schematic diagram of another embodiment of a display device. As shown in FIG. 7, display device 700 includes a backlight unit 702 in an edge-lit configuration that incorporates a light source 704 and a light guide plate 706 that provide unpolarized blue light B along a propagation direction towards a color conversion layer 710. Color conversion layer 710 is positioned downstream of backlight unit 702 with respect to the propagation direction to receive the unpolarized blue light B. In this embodiment, color conversion layer 710 is provided as a QR film that includes green rods (e.g., rod 712) and red rods (e.g., rod 714) that are aligned to induce anisotropic emission.

Within color conversion layer 710, the unpolarized blue light B excites the green and red quantum rods. In this example, the larger dipole moment of the QRs is aligned with the x-axis, which determines the preferred emission direction. Simultaneously, absorption along the x-axis is stronger than absorption along the y-axis. As a result, most of the blue light oriented along the x-axis is absorbed, leaving partially linearly polarized blue light oriented along the y-axis. Thus, the polarization directions downstream of color conversion layer 710 of the remaining blue light (y-axis), and emitted green light and red light (x-axis) are orthogonal.

The remaining blue light and emitted green light and red light is directed to a patterned phase retarder 720 that is positioned downstream of color conversion layer 710. Patterned phase retarder 720 incorporates half-wave regions (e.g., half-wave region 722) and free regions (e.g., free region 724) that are aligned for selectively altering the polarization of received light and propagating that light downstream to a polarizer 730. In particular, the half-wave regions switch the polarization of received light, while the free regions do not. Thus, the light passing through the free regions retains its upstream polarization ratio; however, the light passing through the half-wave regions is altered.

In this embodiment, polarization of the light passing through the half-wave regions is switched by 90°, thus changing the sign (+/−) of the polarization ratio so that the upstream polarization ratio of the light passing through the half-wave regions exhibits a change in sign with respect to the downstream polarization ratio (i.e., after passage of the patterned phase retarder). As an example, blue light passing through half-wave region 722 changes from predominantly y-axis polarization to predominantly x-axis polarization.

Based on the upstream polarization ratios exhibited by the light after passing through patterned phase retarder 720, the light received by polarizer 730 is selectively filtered. In this example, polarizer 330 is configured with a transmission axis that is orthogonal to the alignment direction of the quantum rod alignment, thus only light with y-axis polarization is passed downstream to display medium 740. Since the free regions are aligned with the blue sub-pixels in this embodiment, this ensures that y-axis polarized blue light is directed towards the blue pub-pixels to the exclusion of green and red light. Half-wave region alignment with the green sub-pixels and red sub-pixels ensures that green light and red light are directed toward these sub-pixels to the exclusion of blue light.

Downstream of polarizer 730 is a display medium 740, which incorporates a color filter array and an LC layer (both of which are not shown), and an analyzer 770. The color filter array of display medium 740 includes an array of sub-pixels, including a plurality of blue sub-pixels (e.g., sub-pixel 752), a plurality of green sub-pixels (e.g., sub-pixel 754), and a plurality of red sub-pixels (e.g., sub-pixel 756). In this embodiment, the blue sub-pixels are aligned (i.e., at least substantially aligned) with respect to the propagation direction with the free regions, and the green sub-pixels and red sub-pixels are aligned (i.e., at least substantially aligned) with the half-wave regions of patterned phase retarder 720.

Figure 8:
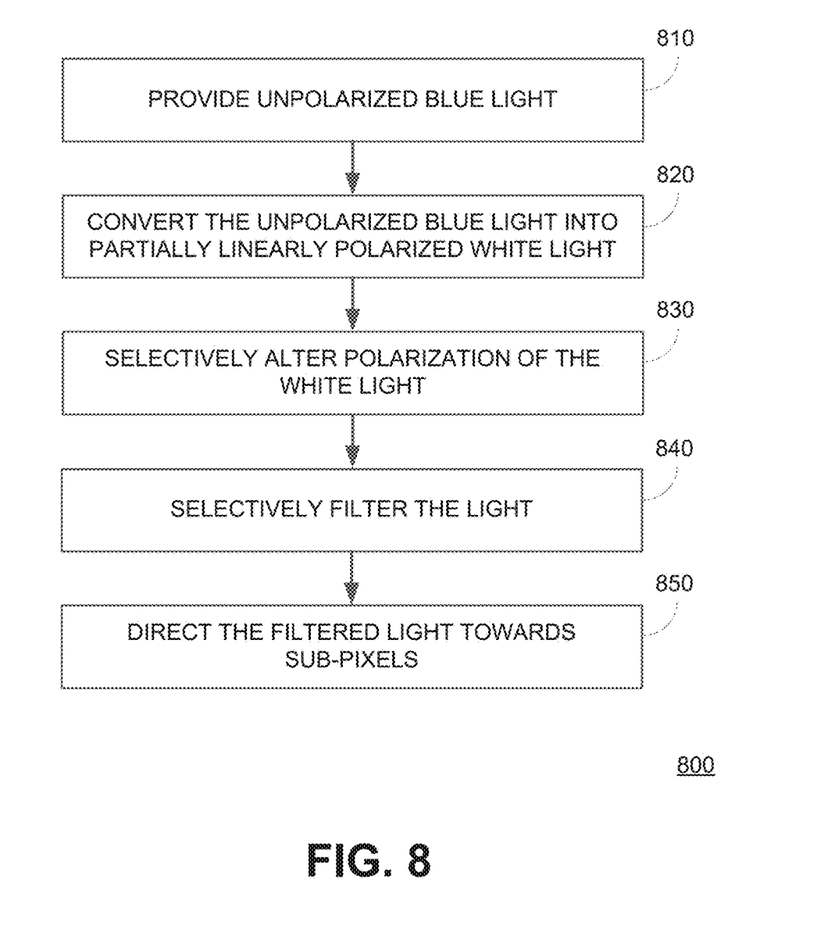
FIG. 8 is a flowchart depicting an embodiment of a display method.

FIG. 8 is a flowchart depicting another embodiment of a display method. As shown in FIG. 8, the method may be construed as beginning at block 810, in which unpolarized blue light is provided. In block 820, the unpolarized blue light is converted into partially linearly polarized white light. In particular, this white light includes partially linearly polarized blue light oriented along a first polarization axis (e.g., y-axis), as well as green light and red light, both of which are partially linearly polarized along a second polarization axis (e.g., x-axis). Then, in block 830, polarizations of the remaining blue light and emitted green light and red light are selectively altered by being passed through a patterned phase retarder.

In block 840, the blue light, the green light, and the red light of the white light are selectively filtered based on their respective polarizations, such as by directing the light to one or more polarizers. The filtered blue light, green light, and red light are then directed to towards desired sub-pixels of a display device (block 850). In some embodiments, this involves directing the blue light to the blue pub-pixels to the exclusion of green and red light, as well as directing green light and red light to green and red sub-pixels to the exclusion of blue light.

The embodiments described above are illustrative of the invention and it will be appreciated that various permutations of these embodiments may be implemented consistent with the scope and spirit of the invention.

What is claimed is:

1. A display device comprising:
   a backlight unit having a light source and a color conversion layer, the backlight unit being configured to emit light along a propagation direction, the light comprising a first light exhibiting a first upstream polarization ratio, a second light exhibiting a second upstream polarization ratio, and a third light exhibiting a third upstream polarization ratio, the color conversion layer having an alignment direction perpendicular to the propagation direction; and
   a patterned phase retarder positioned to receive the light emitted from the backlight unit, the patterned phase retarder having a plurality of half-wave regions, configured to alter polarization of light passing therethrough, and a plurality of free regions, configured to pass light therethrough without substantially altering polarization of the light;
   wherein polarization ratio (PR) is defined by $PR=(I_\parallel - I_\perp)/(I_\parallel + I_\perp)$, with $I_\parallel$ being peak intensity of light polarized parallel to the alignment direction, and $I_\perp$ being peak intensity of light polarized perpendicular to the alignment direction; and
   wherein the first upstream polarization ratio exhibits a first sign, and both the second upstream polarization ratio and the third upstream polarization ratio exhibit a second sign opposite the first sign.

2. The display device of claim 1, wherein the display device further comprises a plurality of sub-pixels positioned to receive light from the patterned phase retarder, the sub-pixels comprising first sub-pixels configured to receive the first light, second sub-pixels configured to receive the second light, and third sub-pixels configured to receive the third light.

3. The display device of claim 2, wherein:
   the plurality of half-wave regions are positioned to propagate the first light to the first sub-pixels; and
   the plurality of free regions are positioned to propagate the second light and the third light to the second sub-pixels and third sub-pixels, respectively.

4. The display device of claim 2, wherein:
   the plurality of free regions are positioned to propagate the first light to the first sub-pixels; and
   the plurality of half-wave regions are positioned to propagate the second light and the third light to the second sub-pixels and third sub-pixels, respectively.

5. The display device of claim 2, wherein the first sub-pixels are blue sub-pixels, the second sub-pixels are red sub-pixels, and the third sub-pixels are green sub-pixels.

6. The display device of claim 1, further comprising a polarizer positioned to receive light from the patterned phase retarder.

7. The display device of claim 6, further comprising a reflective polarizer positioned between the patterned phase retarder and the polarizer.

8. The display device of claim 6, wherein the polarizer is configured to propagate light exhibiting a polarization direction corresponding to the first sign of the first upstream polarization ratio of the first light.

9. The display device of claim 6, wherein the polarizer is configured to propagate light exhibiting a polarization direction corresponding to the second sign of the second upstream polarization ratio of the second light and the third upstream polarization ratio of the third light.

10. The display device of claim 1, wherein the first light is blue light, the second light is red light, and the third light is green light.

11. The display device of claim 1, further comprising a layer of liquid crystal material positioned to receive the light from the patterned phase retarder.

12. The display device of claim 1, wherein the light source of the backlight unit is configured to emit blue light.

13. The display device of claim 1, wherein the color conversion layer comprises a quantum rod film.

14. The display device of claim 1, wherein the patterned phase retarder comprises first and second substrates with liquid crystal material therebetween, the liquid crystal material in the half-wave regions exhibiting an approximately 90 degree twist, the liquid crystal material in the free regions exhibiting homogeneous alignment.

15. A display method comprising:
propagating a light through a color conversion layer such that a first light exhibits a first upstream polarization ratio, a second light exhibits a second upstream polarization ratio, and a third light exhibits a third upstream polarization ratio, the color conversion layer having an alignment direction perpendicular to a propagation direction of the light; and
propagating the first light, the second light and the third light through a patterned phase retarder having a plurality of half-wave regions, configured to alter polarization of light passing therethrough, and a plurality of free regions, configured to pass light therethrough without altering polarization of the light;
wherein polarization ratio (PR) is defined by $PR=(I_\parallel - I_\perp)/(I_\parallel + I_\perp)$, with $I_\parallel$ being peak intensity of light polarized parallel to the alignment direction, and $I_\perp$ being peak intensity of light polarized perpendicular to the alignment direction; and
wherein the first upstream polarization ratio exhibits a first sign, and both the second upstream polarization ratio and the third upstream polarization ratio exhibit a second sign opposite the first sign.

16. The display method of claim 15, further comprising:
directing the first light to a plurality of first sub-pixels;
directing the second light to a plurality of second sub-pixels; and
directing the third light to a plurality of third sub-pixels.

17. The display method of claim 15, wherein the first sub-pixels are blue sub-pixels, the second sub-pixels are red sub-pixels, and the third sub-pixels are green sub-pixels.

18. The display method of claim 15, wherein the first light is blue light, the second light is red light, and the third light is green light.

* * * * *